(12) United States Patent
Matsue

(10) Patent No.: US 9,529,339 B2
(45) Date of Patent: Dec. 27, 2016

(54) RADIO RECEIVER AND ELECTRONIC TIMEPIECE

(71) Applicant: CASIO COMPUTER CO., LTD., Shibuya-ku, Tokyo (JP)

(72) Inventor: Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/830,449

(22) Filed: Aug. 19, 2015

(65) Prior Publication Data
US 2016/0061960 A1   Mar. 3, 2016

(30) Foreign Application Priority Data
Aug. 29, 2014   (JP) ................. 2014-174706

(51) Int. Cl.
G04R 20/04 (2013.01)
G01S 19/14 (2010.01)
G01S 19/28 (2010.01)
G01S 19/34 (2010.01)
G01S 19/36 (2010.01)

(52) U.S. Cl.
CPC ............. *G04R 20/04* (2013.01); *G01S 19/34* (2013.01); *G01S 19/36* (2013.01); *G01S 19/14* (2013.01); *G01S 19/28* (2013.01)

(58) Field of Classification Search
CPC ......... G04R 20/04; G04R 20/06; G04R 20/10; G04R 20/14; G04R 20/20; G01S 19/24; G01S 19/28; G01S 19/34; G01S 19/14; G01S 19/36
See application file for complete search history.

(56) References Cited

U.S. PATENT DOCUMENTS 7,720,452 B2*   5/2010   Miyahara ............... G04G 5/002
                                                                  368/47
8,044,855 B2   10/2011   Hanabusa
8,116,170 B2*   2/2012   Matsuzaki ............... G01S 19/14
                                                                  342/357.72

(Continued)

FOREIGN PATENT DOCUMENTS

JP   2009300274 A   12/2009
JP   2010032556 A   2/2010

Primary Examiner — Vit W Miska
(74) Attorney, Agent, or Firm — Holtz, Holtz & Volek PC

(57) ABSTRACT

A radio receiver receives transmitted radio waves from positioning satellites, and includes: a signal amplification unit configured to amplify a received signal; an acquisition unit configured to acquire a satellite signal from the amplified signal; and a control unit configured to obtain predetermined information from the acquired satellite signal, determine a reception condition of transmitted radio waves based on the processing condition of at least one of the obtainment and the acquisition unit, and performs operation setting of a gain of the signal amplification unit according to the determined reception condition, wherein the control unit performs the operation setting so that the gain set in the operation setting when the reception condition is determined to be a first reception condition is smaller than the gain set in the operation setting when the reception condition is determined to be a second reception condition inferior to the first reception condition.

18 Claims, 10 Drawing Sheets

(56) References Cited

U.S. PATENT DOCUMENTS

| | | | |
|---|---|---|---|
| 2009/0079630 A1* | 3/2009 | Baba | G01S 19/14 342/357.52 |
| 2009/0274011 A1* | 11/2009 | Fujisawa | G04G 5/002 368/47 |
| 2012/0257479 A1* | 10/2012 | Fujisawa | G01S 19/14 368/47 |
| 2013/0051188 A1* | 2/2013 | Akiyama | G04R 20/04 368/47 |
| 2015/0071041 A1* | 3/2015 | Akiyama | G04R 20/04 368/47 |

* cited by examiner

FIG. 4

|  | SWITCH | | NF(dB) |
| --- | --- | --- | --- |
|  | 117a | 117b | |
| HIGH POWER MODE | OFF | ON | 3 |
| MEDIUM POWER MODE | ON | OFF | 8 |
| LOW POWER MODE | ON | ON | 15 |

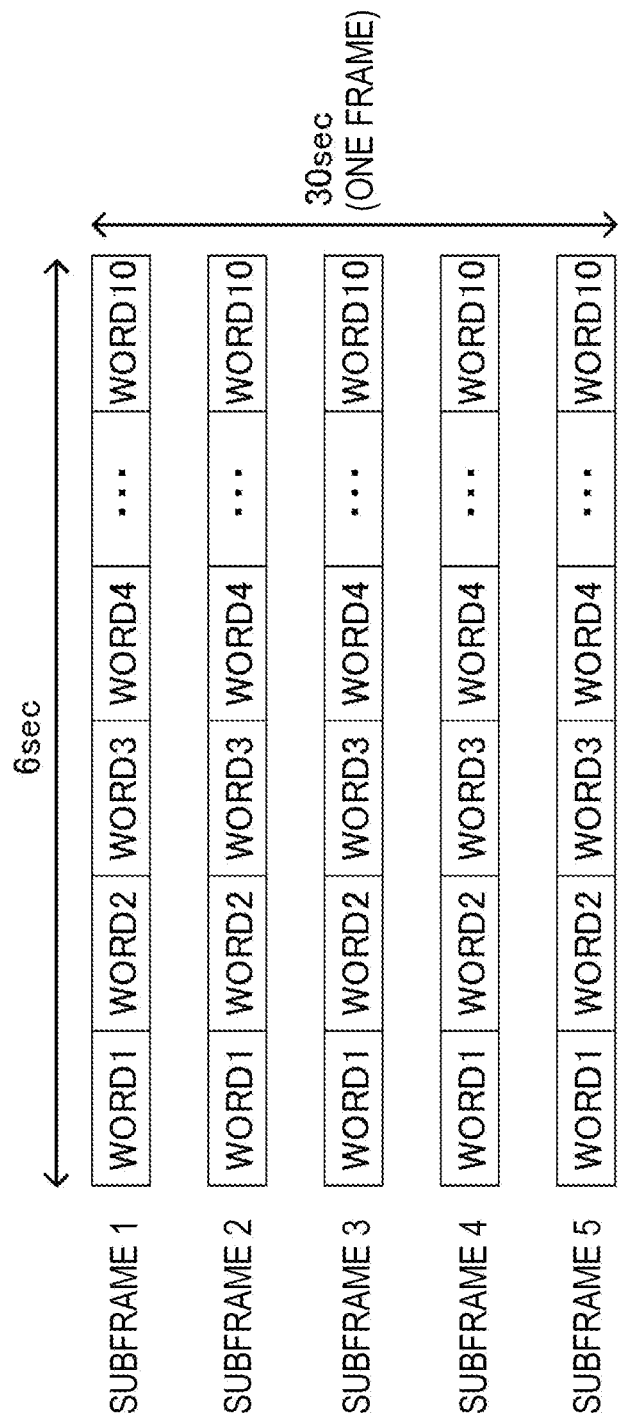

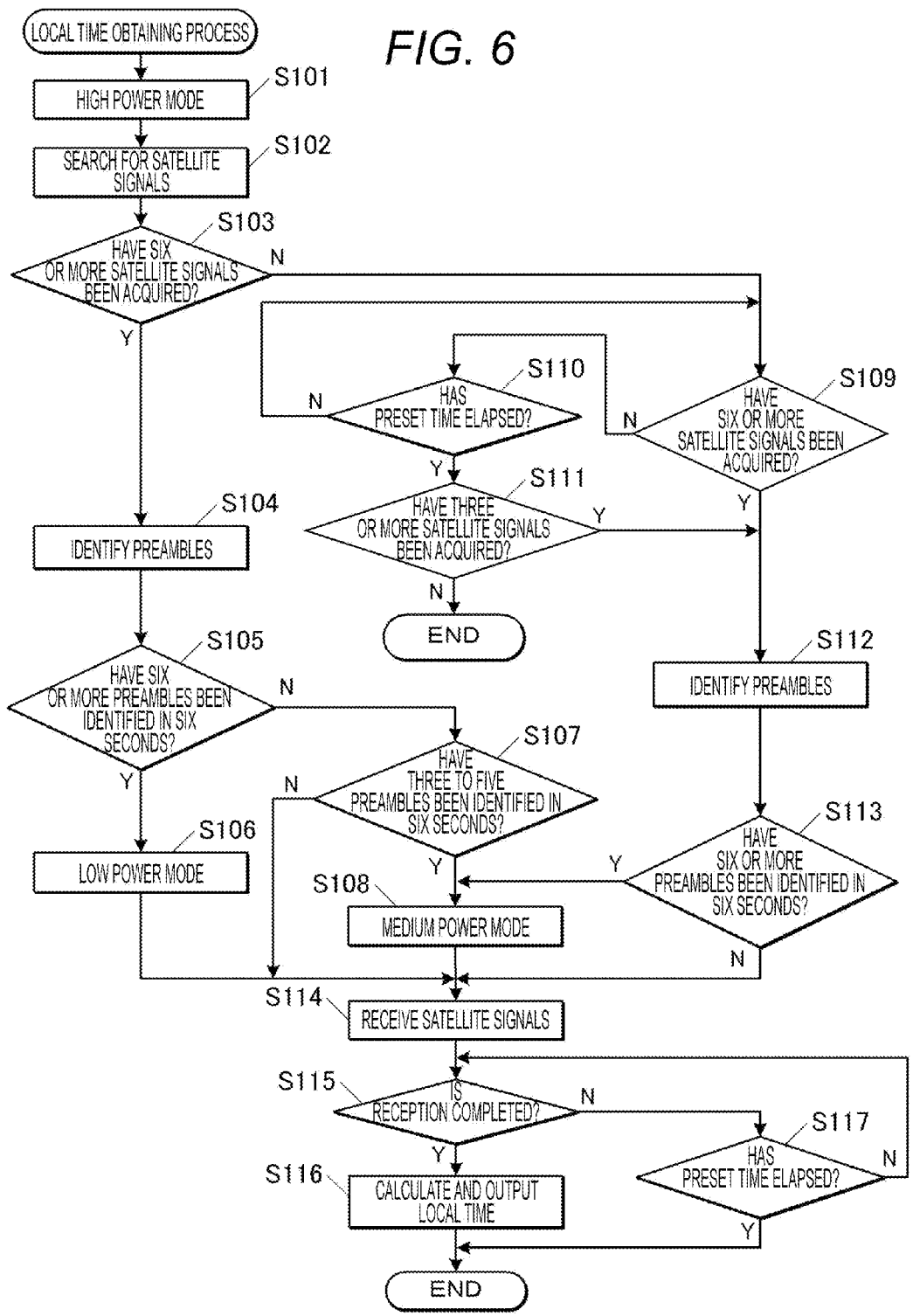

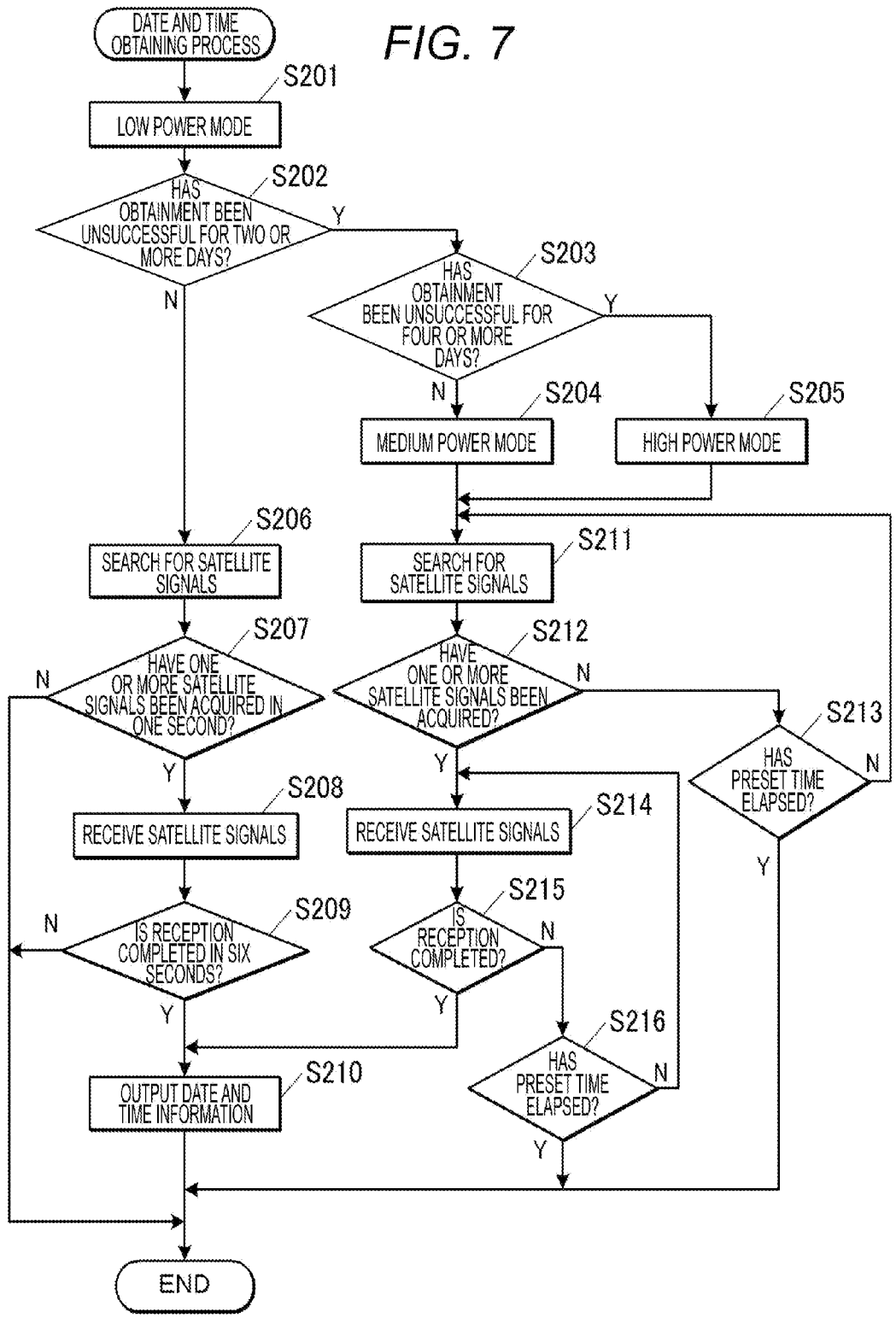

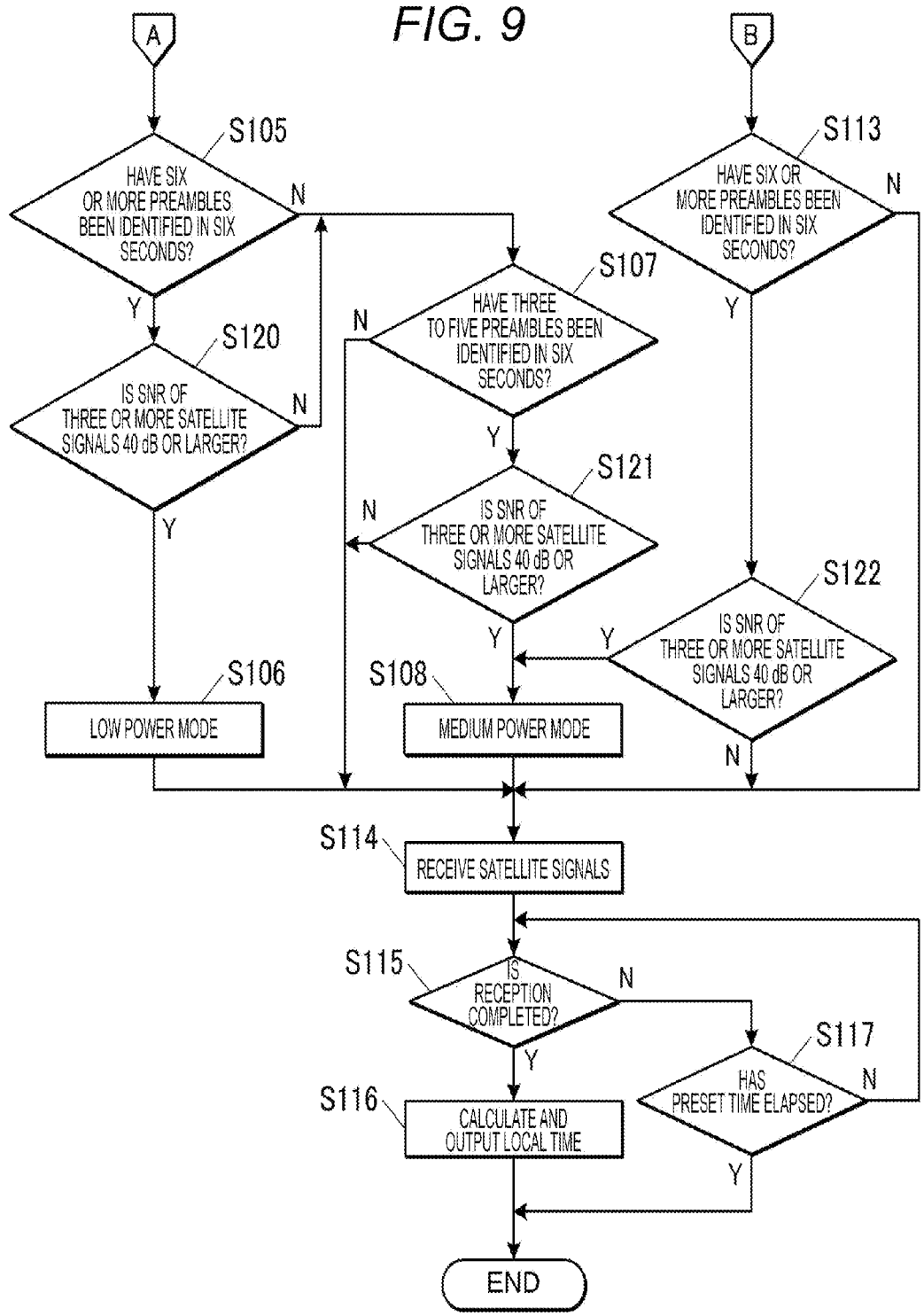

RADIO RECEIVER AND ELECTRONIC TIMEPIECE

BACKGROUND OF THE INVENTION

This invention relates to a radio receiver and an electronic timepiece that receive radio waves transmitted from positioning satellites.

In related art, there are electronic timepieces that receive radio waves transmitted from positioning satellites of a global navigation satellite system (GNSS) to obtain date and time and a position. Such an electronic timepiece amplifies, converts the frequencies of, and filters the received radio waves by RF (radio frequency) circuits, and demodulates and decodes the radio waves in a demodulated signal process to obtain necessary information.

In reception of radio waves transmitted from positioning satellites, there are specific circumstances in which satellite signals of transmitted radio waves that can be received need to be quickly searched for and acquired from radio waves transmitted from multiple positioning satellites and in which these acquired satellite signals need to be obtained in parallel. A receiver having sufficient sensitivity is therefore required for performing such operations. Thus, a high gain and a low noise figure (NF) are required of RF circuits mounted in the electronic timepiece. As a result, power consumed by the RF circuits has a significant influence on the power consumption of the entire electronic timepiece. There have therefore been attempts to reduce power consumption of RF circuits as part of reduction in power consumption of electronic timepieces.

JP 2009-300274 A that is a Japanese patent document, for example, discloses a receiver that interrupts power supply to RF circuits after acquisition of satellite signals and supplies power to the RF circuits only at timings at which necessary information can be obtained so as to reduce power consumption.

Reception conditions of radio waves from positioning satellites, however, greatly change depending on the receiver environments. Hence uniform reception operation where the reception conditions are not considered may disadvantageously consume power in excess.

This invention is directed to a radio receiver and an electronic timepiece capable of optimizing power consumption depending on reception conditions of radio waves transmitted from positioning satellites.

SUMMARY OF THE INVENTION

To achieve the aforementioned object, an aspect of the present invention is a radio receiver including: a signal amplification unit configured to receive a radio wave transmitted from a positioning satellite and amplify a signal of the received transmitted radio wave; an acquisition unit to which the signal amplified by the signal amplification unit is input, the acquisition unit being configured to acquire a satellite signal containing position information and date and time information from the signal; and a control unit configured to obtain at least one of the position information and the date and time information from the satellite signal acquired by the acquisition unit, determine a reception condition of the transmitted radio wave based on at least one of a processing condition of the obtainment and a processing condition of the acquisition unit, and perform operation setting of a gain of the signal amplification unit according to the determined reception condition, wherein the control unit performs the operation setting so that the gain set in the operation setting when the reception condition is determined to be a first reception condition is smaller than the gain set in the operation setting when the reception condition is determined to be a second reception condition inferior to the first reception condition.

BRIEF DESCRIPTION OF THE DRAWINGS

FIG. 4 is a table explaining operation modes of the RF amplification unit; FIGS. 5A and 5B are diagrams explaining a transmission format of a satellite signal;

FIG. 6 is a flowchart illustrating control procedures of a local time obtaining process;

FIG. 7 is a flowchart illustrating control procedures of a date and time obtaining process according to a second embodiment;

FIG. 9 is a second part of the flowchart illustrating the control procedures of the local time obtaining process according to the third embodiment.

DETAILED DESCRIPTION

[First Embodiment]

A first embodiment of the present invention will be described below with reference to the drawings.

Figure 1:
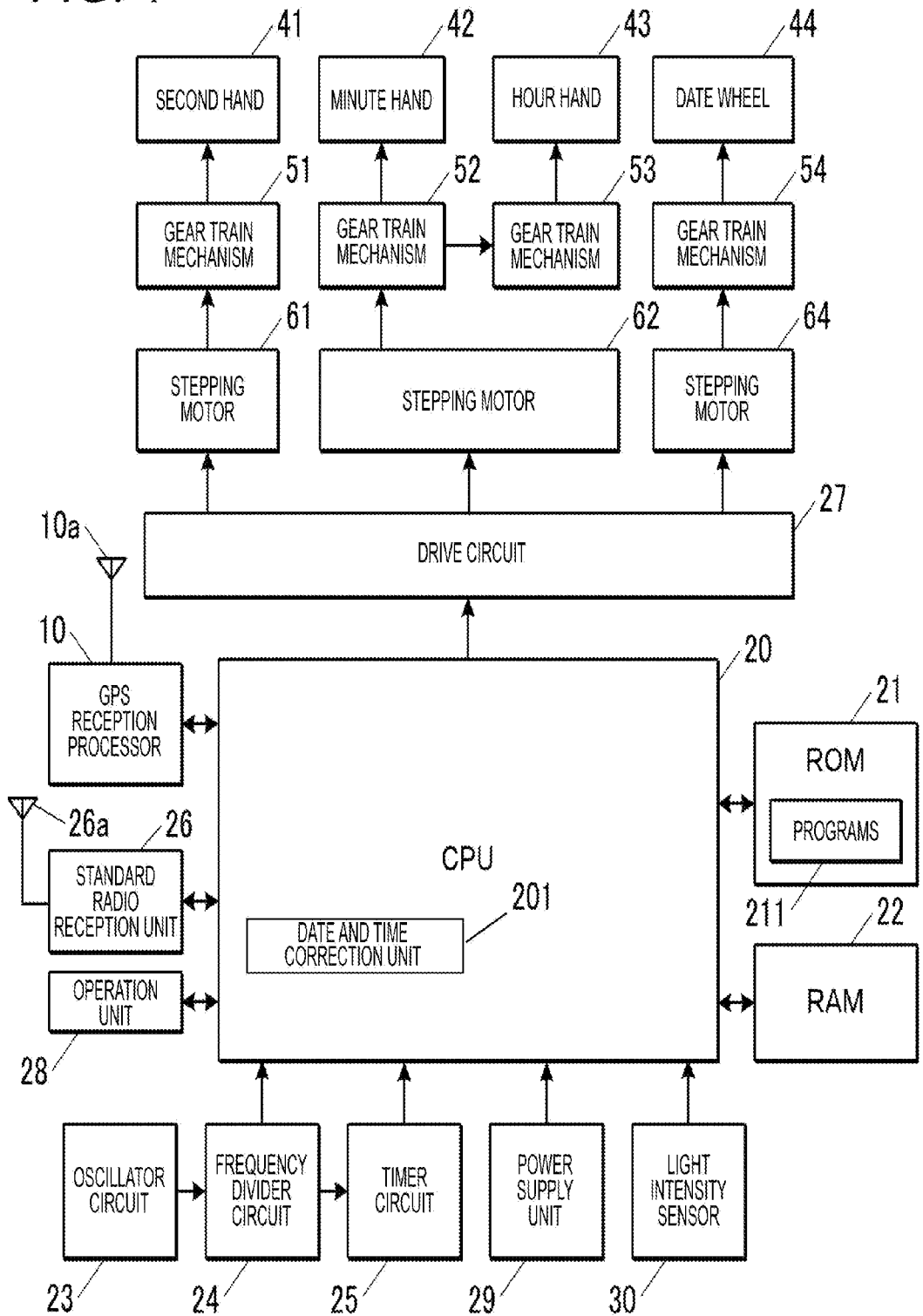
FIG. 1 is a block diagram illustrating a functional configuration of an electronic timepiece according to a first embodiment of a receiver and electronic timepiece of the present invention.

FIG. 1 is a block diagram illustrating a functional configuration of an electronic timepiece 1 according to the first embodiment of a radio receiver and electronic timepiece of the present invention.

The electronic timepiece 1 is an analog electronic timepiece for displaying date and time using hands, but is not particularly limited thereto. The electronic timepiece 1 includes a control unit 20 (central processing unit) (date and time correction unit 201), a read only memory (ROM) 21, a random access memory (RAM) 22, an oscillator circuit 23, a frequency divider circuit 24, a timer circuit 25 (timer unit), a GPS reception processor 10 and an antenna 10a thereof, a standard radio reception unit 26 and an antenna 26a thereof, a drive circuit 27, an operation unit 28, a power supply unit 29, a light intensity sensor 30, a second hand 41 and a gear train mechanism 51 for rotation thereof, a minute hand 42 and a gear train mechanism 52 for rotation thereof, an hour hand 43 and a gear train mechanism 53 for rotation thereof, a date wheel 44 and a gear train mechanism 54 for rotation thereof, stepping motors 61, 62, and 64 for driving the gear train mechanisms 51 to 54, and the like. Among these components, a part including the GPS reception processor 10 and the antenna 10a corresponds to the radio receiver.

The control unit 20 performs various computation processes and generally controls overall operation of the electronic timepiece 1. The control unit 20 controls operations of the hands to present various displays including the date and time with the hands. The control unit 20 also causes the standard radio reception unit 26 to operate to obtain received data and calculate the date and time. The control unit 20 causes the GPS reception processor 10 to operate to obtain date and time information and correct the date and time counted by the timer circuit 25 based on the obtained date and time information.

The ROM 21 stores various control programs 211 and the like to be executed by the control unit 20. The programs 211 include a date and time correction program for correcting the date and time counted by the timer circuit 25, for example.

The RAM 22 provides a working memory space for the control unit 20, and store temporary data. The RAM 22 also has stored therein data indicating date and time correction, a positioning result, a set time zone, and hand positions, etc.

The oscillator circuit 23 generates and outputs a predetermined frequency signal. The oscillator circuit 23 includes a crystal oscillator, for example.

The frequency divider circuit 24 divides the frequency signal output from the oscillator circuit 23 to obtain signals having frequencies to be used by the control unit 20 and the timer circuit 25, and outputs the obtained signals. The output frequencies may be capable of being changed by a control signal from the control unit 20.

The timer circuit 25 counts the frequency-divided signals input from the frequency divider circuit 24 and adds the counts to an initial value indicating predetermined date and time to count the current date and time. The date and time counted by the timer circuit 25 can be corrected by a control signal from the control unit 20.

The operation unit 28 receives input operation from the user. The operation unit 28 includes a push-button switch and a winder, for example, detects operations such as pushing of the push-button switch, and pulling out and rotating of the winder, and outputs an electrical signal according to the type of operation to the control unit 20.

The standard radio reception unit 26 receives radio waves in a long wavelength range with the antenna 26*a*, demodulates an amplitude-modulated time code output (TCO) of standard radio waves, and outputs the demodulation result to the control unit 20. The frequency tuned to the radio waves in the long wavelength range by the standard radio reception unit 26 is regulated according to a transmission frequency from a standard wave transmitting station to be received under the control of the control unit 20. The standard radio reception unit 26 also performs various processes for improving the receiving sensitivity, digitalizes analog signals with a predetermined sampling frequency, and outputs the resulting signals to the control unit 20.

The GPS reception processor 10 receives radio waves in the L1 band (1.57542 GHz) with the antenna 10*a*, and demodulates and decrypts the spread-spectrum radio waves transmitted from positioning satellites, which are GPS satellites herein, to decode satellite signals (navigation messages). The GPS reception processor 10 also calculates a current date and time and a current position based on the decoding result. The content of the decoded satellite signals is output in a predetermined format to the control unit 20. Control on operations for the reception, decoding and output is performed by a control unit 123 (FIG. 2) provided in the GPS reception processor 10. The configurations for performing the operations for the demodulation, decryption, decoding, and control in the GPS reception processor 10 are collectively formed as a module on a single chip, and connected to the control unit 20. On/off control of the operation of the GPS reception processor 10 is performed by the control unit 20 independently of the operations of the other components of the electronic timepiece 1. When the operation of the GPS reception processor 10 is the off state, power supply to the GPS reception processor 10 is also interrupted for power saving. A detailed configuration of the GPS reception processor 10 will be described later.

The power supply unit 29 supplies power at a predetermined voltage for operations of the components. The power supply unit 29 has a battery, which includes a solar panel and a secondary battery, for example. Alternatively, a replaceable button dry battery may be used for the battery.

The light intensity sensor 30 is provided at a position near a dial provide on a surface for display of the electronic timepiece 1, where the light intensity sensor 30 is capable of receiving light incident on the surface for display from outside, for example, and measures the intensity of the incident light. A photodiode, for example, is used for the light intensity sensor 30. The light intensity sensor 30 outputs an electrical signal (voltage signal or current signal) according to the incident light intensity, which is subjected to digital sampling at an analog-to-digital converter (ADC) that is not illustrated, and input to the control unit 20. Alternatively, when a solar panel is used for the power supply unit 29, the incident light intensity may be measured based on generated electromotive force of the solar panel.

The second hand 41, the minute hand 42, the hour hand 43, and the date wheel 44 (some or all of which will also be collectively referred to as hands) are hands indicating the second, the minute, the time, and the date, respectively, in display of the date and time. Herein, the second hand 41, the minute hand 42, and the hour hand 43 are needle-like hands that rotate about a rotation axis that is substantially the center of the dial provided on a surface (display surface) of the electronic timepiece 1, and indicates various function types and states by pointing a scale and signs provided on the dial. The date wheel 44 is a rotatable disk or an annular member provided in parallel with the dial on a back side of the dial (opposite to the display surface). The date wheel 44 is provided with signs indicating dates at regular intervals on a circumference of the surface thereof facing the dial. One sign is exposed through an opening formed in the dial to indicate the date.

The gear train mechanism 51 is a train of gears for transmitting turning by a predetermined angle (6 degrees herein) to the second hand 41 each time the stepping motor 61 is rotated. The gear train mechanism 52 transmits turning by a predetermined angle (1 degree herein) to the minute hand 42 each time the stepping motor 62 is rotated. The gear train mechanism 53 rotates in conjunction with the rotation of the gear train mechanism 52, and transmits 1/12 of the turning of the minute hand 42 to the hour hand 43. In other words, the hour hand 43 turns by 30 degrees each time the minute hand 42 makes one rotation of 360 degrees, and the minute hand 42 makes 12 rotations on the dial while the hour hand 43 makes one rotation of 360 degrees. The gear train mechanism 54 transmits turning by a predetermined angle to the date wheel 44 each time the stepping motor 64 is rotated. The date wheel 44 is turned by 360/31 degrees by every 1440 steps of rotation, for example, which changes the sign exposed through the opening by one day.

In each of the stepping motors 61, 62, and 64, a rotor turns by a predetermined angle relative to a stator in response to a drive pulse input from the drive circuit 27. The rotations of the rotors are transmitted to the gear train mechanisms 51 to 54, respectively, as described above.

The drive circuit 27 outputs a drive pulse at a predetermined voltage to each of the stepping motors 61, 62, and 64 according to a control signal from the control unit 20. The drive circuit 27 can change the length (pulse width) of the drive pulse depending on the state of the electronic timepiece 1 or the like. When a control signal for driving a plurality of hands at the same time is input, the drive circuit 27 outputs drive pulses at output timings different from one another so as to reduce a peak load.

Figure 2:
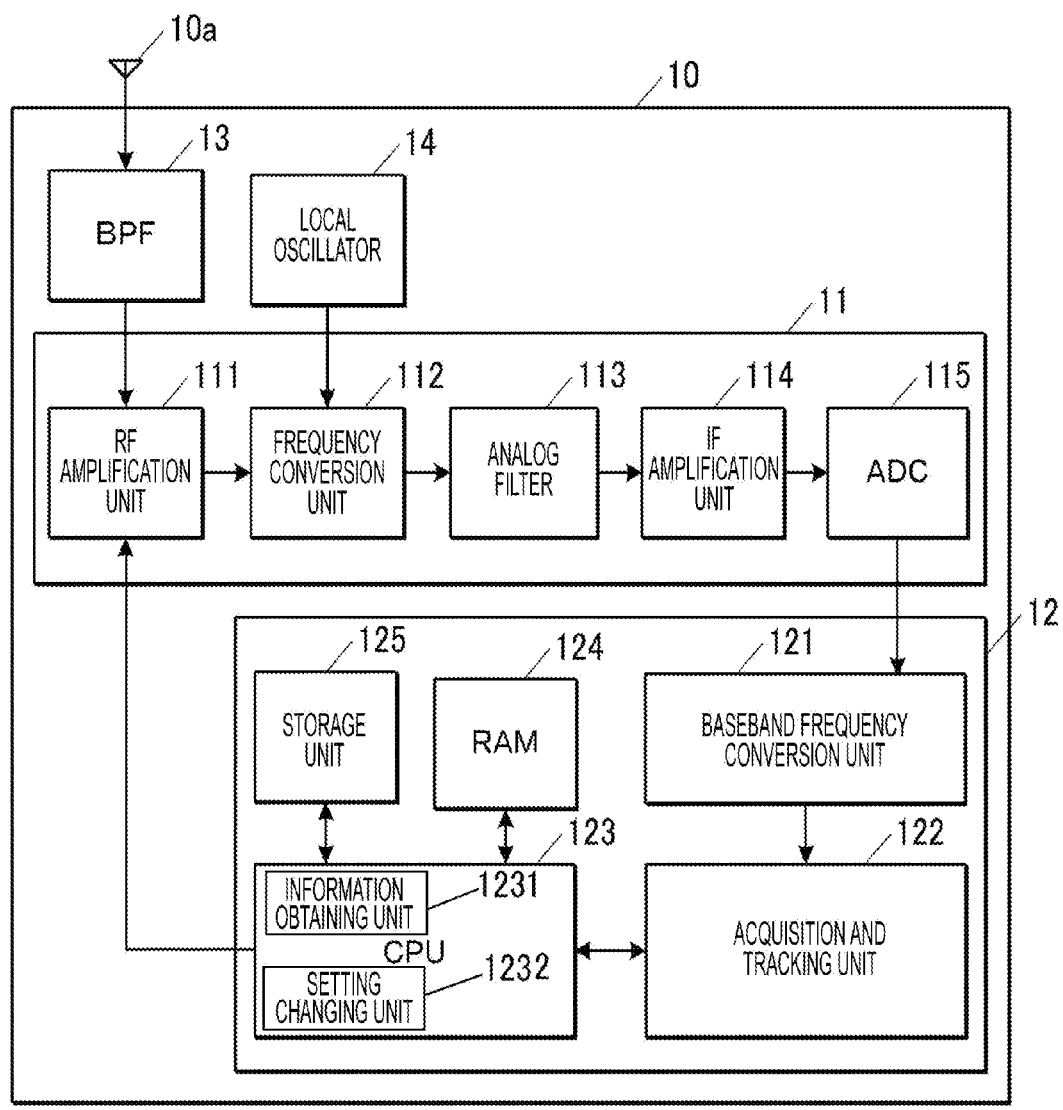
FIG. 2 is a block diagram illustrating a functional configuration of a GPS reception processor.

FIG. 2 is a block diagram illustrating a functional configuration of the GPS reception processor 10.

The GPS reception processor 10 includes a band pass filter (BPF) 13, a RF signal processor 11 connected with the BPF 13, a local oscillator 14 and a baseband signal processor 12 connected with the RF signal processor 11, and the like.

The BPF 13 is a filter that selectively transmits only radio signals having components in a predetermined frequency band containing the L1 band among radio waves transmitted from GPS satellites and received by the antenna 10a and outputs the transmitted radio signals to a RF amplification unit 111 of the RF signal processor 11. For the BPF 13, a surface acoustic wave (SAW) filter is used, for example.

The RF signal processor 11 includes the RF amplification unit 111 (signal amplification unit), a frequency conversion unit 112, an analog filter 113, an intermediate frequency (IF) amplification unit 114, and an analog-to-digital converter (ADC) 115.

The RF amplification unit 111 amplifies a radio signal input from the BPF 13, and outputs the amplified signal to the frequency conversion unit 112. The RF amplification unit 111 is a variable gain amplifier (VGA) capable of gain control.

Figure 3:
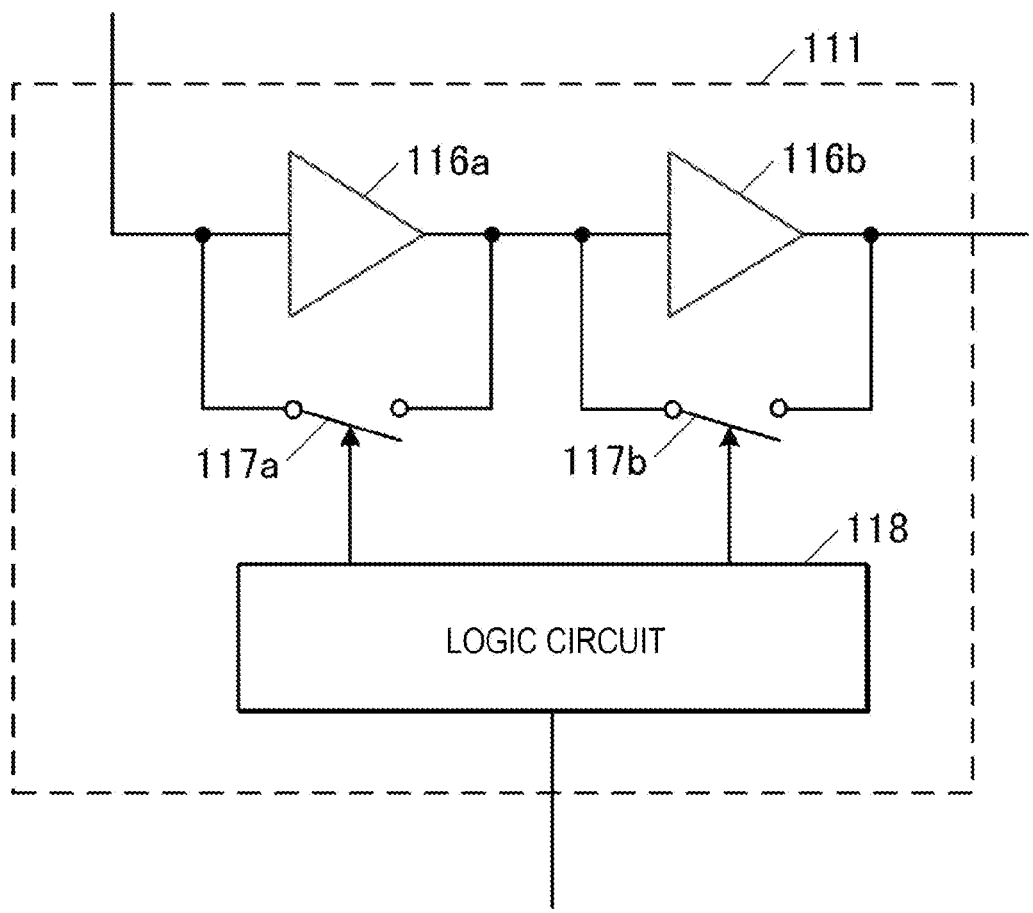
FIG. 3 is a block diagram illustrating a functional configuration of a RF amplification unit.

FIG. 3 is a block diagram illustrating a functional configuration of the RF amplification unit 111.

The RF amplification unit 111 includes two low noise amplifiers (LNAs) 116a and 116b (amplification units) connected in series in this order between the BPF 13 and the frequency conversion unit 112, a switch 117a (switching unit) that short-circuits between an input and an output of the LNA 116a so that a signal passes through the switch 117a bypassing the LNA 116a, a switch 117b (switching unit) that short-circuits between an input and an output of the LNA 116b so that a signal passes through the switch 117b bypassing the LNA 116b, a logic circuit 118 that outputs a signal to turn on (into a conductive state) or off (into a non-conductive state) the switches 117a and 117b to the switches 117a and 117b based on a control signal input from the control unit 123, and the like. Power supply voltages are supplied to the LNAs 116a and 116b independently of each other. When the switch 117a is in an on state, supply of power supply voltage to the LNA 116a is interrupted, and when the switch 117b is in an on state, supply of power supply voltage to the LNA 116b is interrupted.

When the switch 117a is turned off and the switch 117b is turned on, the RF amplification unit 111 performs signal amplification only with the LNA 116a. When the switch 117a is turned on and the switch 117b is turned off, the RF amplification unit 111 performs signal amplification only with the LNA 116b. In addition, when both of the switches 117a and 117b are turned on, the RF amplification unit 111 does not perform signal amplification.

The gains and noise figures (NFs) of the LNAs 116a and 116b are set to predetermined values, and the gain, the NF and the power consumption of the RF amplification unit 111 are determined on which of the LNAs 116a and 116b performs signal amplification. Note that a NF is a ratio of the signal-to-noise ratio (SNR) of an input signal to that of an output signal. As the NF of the RF amplification unit 111 is smaller, the sensitivity of signal reception at the GPS reception processor 10 is higher.

In the present embodiment, the gains of the LNAs 116a and 116b are set so that the NF of the LNA 116a becomes 3 dB and the NF of the LNA 116b becomes 8 dB. In this manner, the LNA 116a is set to have a higher gain and a lower noise figure than the LNA 116b, and the power consumption at the LNA 116a is larger than that at the LNA 116b. With such a configuration, the RF amplification unit 111 can be operated in multiple operation modes with different NFs and different power consumptions by selecting one of the LNAs 116a and 116b to be used for signal amplification in the RF amplification unit 111 or selecting neither of these LNAs.

FIG. 4 is a table explaining the operation modes of the RF amplification unit 111.

The operation mode of the RF amplification unit 111 is selected from a high power mode, a medium power mode, and a low power mode in descending order of power consumption.

In the high power mode, the switch 117a is turned off and the switch 117b is turned on, the RF amplification unit 111 performs signal amplification only with the LNA 116a, and the NF of the RF amplification unit 111 is 3 dB.

In the medium power mode, the switch 117a is turned on and the switch 117b is turned off, the RF amplification unit 111 performs signal amplification only with the LNA 116b, and the NF of the RF amplification unit 111 is 8 dB.

In the low power mode, both of the switches 117a and 117b are turned on, and the RF amplification unit 111 does not perform signal amplification with either of the LNAs 116a and 116b. In this case the NF of the entire RF signal processor 11 is determined by the NF of a circuit element (a mixer circuit or the like) of the frequency conversion unit 112 located downstream of the RF amplification unit 111. The NF of the circuit element of the frequency conversion unit 112 is 15 dB, for example, and this value is stated in the field of the low power mode in FIG. 4.

In the electronic timepiece 1, the control unit 123 performs setting (operation setting) for causing the RF amplification unit 111 to operate in one of these operation modes. A specific control method for the operation setting will be described later.

The local oscillator 14 is a reference frequency source constituted by a temperature compensated crystal oscillator (TCXO) or the like, and outputs a signal having the reference frequency (local frequency) to the frequency conversion unit 112.

The frequency conversion unit 112 includes a mixer circuit such as an analog multiplier, and a PLL circuit that outputs a signal having the local frequency generated by using a signal from the local oscillator 14 to the mixer circuit. The frequency conversion unit 112 mixes a signal amplified by the RF amplification unit 111 with the signal having the local frequency and downconverts the resulting signal into an IF band.

The analog filter 113 is constituted by a low-pass filter (LPF), for example, and attenuates components in an unnecessary frequency band of the signal in the IF band input from the conversion unit 112.

The IF amplification unit 114 is an amplifier constituted by a VGA similar to the RF amplification unit 111, for example, and amplifies the signal filtered by the analog filter 113 in the IF band for output to the baseband signal processor 12.

The ADC 115 converts the analog signal in the IF band amplified by the IF amplification unit 114 into a digital signal, and outputs the digital signal to the baseband signal processor 12.

The baseband signal processor 12 includes a frequency conversion unit 121, an acquisition and tracking unit 122 (acquisition unit), the control unit 123 (information obtaining unit 1231, setting changing unit 1232, a RAM 124, a storage unit 125, and the like.

The frequency conversion unit 121 includes a signal integrator and accumulator circuit that converts the digital signal in the IF band output from the ADC 115 into a signal having a baseband frequency.

The acquisition and tracking unit 122 includes a C/A code generator configured to generate a C/A code for acquiring a satellite signal, a matched filter for synchronization between the generated C/A code and a C/A code of the satellite signal, a carrier phase comparator, a frequency comparator, and the like, and performs signal processing for acquisition and tracking of a satellite signal.

The control unit 123 performs various computation processes and generally controls overall operation of the GPS reception processor 10. The control unit 123 causes the acquisition and tracking unit 122 to perform signal processing for acquisition and tracking of a satellite signal. The control unit 123 also outputs a control signal to the logic circuit 118 of the RF amplification unit 111 to perform operation setting of the RF amplification unit 111. The control unit 123 also determines a time zone based on position information and date and time information of an obtained satellite signal and obtains a local time. The control unit 123 includes the information obtaining unit 1231 and the setting changing unit 1232. The information obtaining unit 1231 and the setting changing unit 1232 may be a single control unit 123 or different control units provided separately for the respective operations.

The RAM 124 provides a working memory space for the control unit 123, and store temporary data. The RAM 124 also functions as a history storage unit that stores date and time information, position information and predicted orbit data that have been received and obtained so far for a predetermined period or amount.

The storage unit 125 is a nonvolatile memory such as a flash memory or an electrically erasable and programmable read only memory (EEPROM), and retains storage independent of the power supply state to the GPS reception processor 10. The storage unit 125 has stored therein various operation control programs and setting data. The operation control programs include a local time setting program for obtaining position information and date and time information from a satellite signal and setting a local time based on information on the current position and the like, and a date and time obtaining program for obtaining date and time information from a satellite signal. The setting data includes data for operation setting of the RF amplification unit 111, set values in obtaining predicted orbit information of each GPS satellite and date and time information, and map information for calculating the local time according to the current position. The operation control programs may be stored in a dedicated ROM, and read and loaded into a RAM of a control unit at startup.

Next, a transmission format of a satellite signal from a GPS satellite received by the GPS reception processor 10 will be described.

Figure 5B:
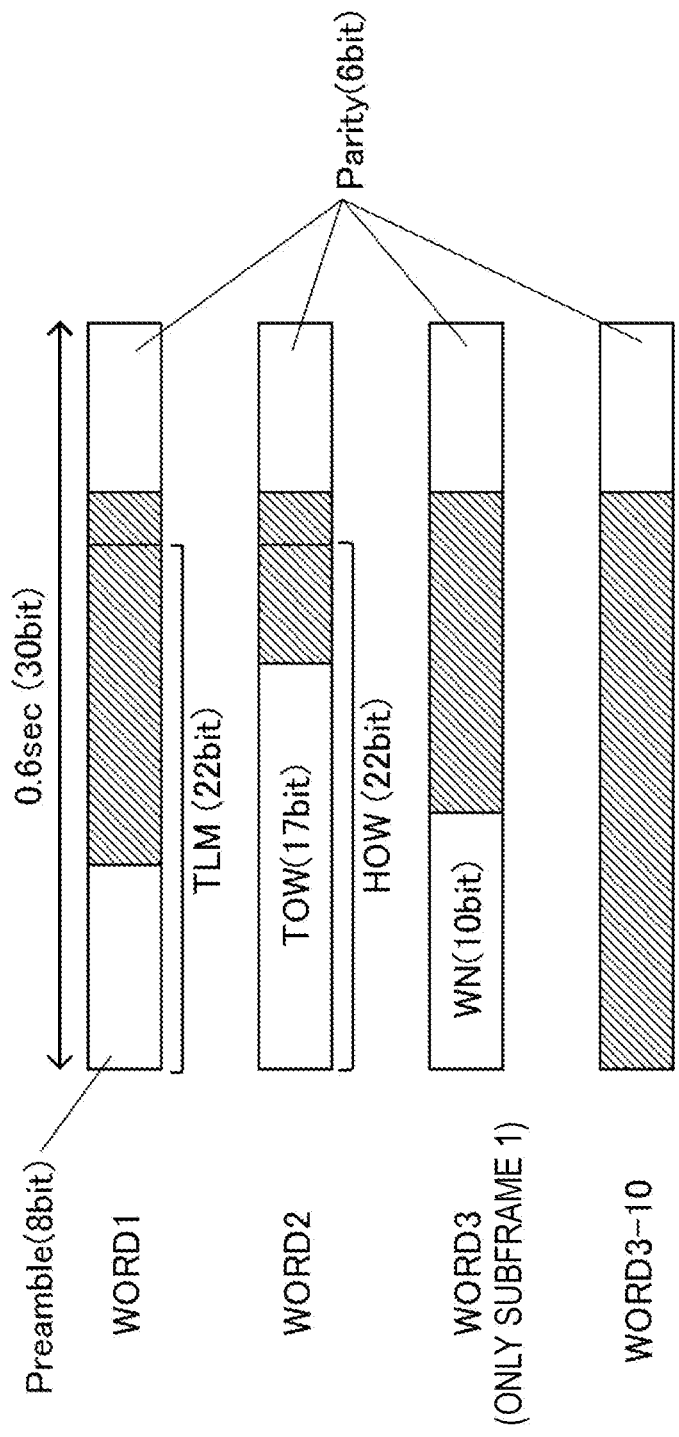

FIGS. 5A and 5B are diagrams explaining the transmission format of a satellite signal. FIG. 5A illustrates the contents frames each constituted by five subframes, and FIG. 5B illustrates the contents of words contained in the subframes.

A satellite signal (navigation message) transmitted from a GPS satellite is composed of 25 frames in units of 30 seconds as illustrated in FIG. 5A. Each frame contains five subframes in units of 6 seconds, and each subframe contains ten words (WORD) in units of 0.6 seconds.

As illustrated in FIG. 5B, each word is composed of 30 bits. Among the words, the formats of WORD1 and WORD2 that are two words from the head of each subframe are common in all of the subframes. WORD1 represents a telemetry word (TLM), in which eight bits from the head constitute a preamble of a fixed pattern used for synchronization. Thus, the position in the subframes (transmission format) of the satellite signal is determined based on the preamble. WORD2 represents a handover word (HOW), in which 17 bits from the head constitute a time of week (TOW) representing the date and time including the day of week and smaller units (elapsed time in a week).

WORD3 that is the third word from the head of each subframe and subsequent words represent different contents in different subframes. In WORD3 of the subframe at the head (SUBFRAME 1), ten bits from the head represent a week number WN. The week number WN expressed by ten bits represents a week number in a 1024-week period. The first period Starts from Jan. 6, 1980, and the second period starts from Aug. 22, 1999.

WORD3 to WORD10 in each of the second and third subframes (SUBFRAME 2, SUBFRAME 3) contain precise orbit information (ephemeris) of a GPS satellite itself that transmits the satellite signal. WORD3 to WORD10 in each of the fourth and fifth subframes (SUBFRAME 4, SUBFRAME 5) contain approximate orbit information (almanac) of all satellites.

Six bits at the end of each word in each substrate are parity bits used for determination of matching of obtained data.

The GPS reception processor 10 obtains precise orbit information in SUBFRAME 2 and SUBFRAME 3 from satellite signals from at least three GPS satellites to calculate the current position of the electronic timepiece 1 on the earth based on the precise orbit information, and obtains precise orbit information in SUBFRAME 2 and SUBFRAME 3 from satellite signals from at least four GPS satellites to calculate the three-dimensional current position of the electronic timepiece 1 based on the precise orbit information. Note that time information necessary for position calculation can be obtained through obtainment of SUBFRAME 1 or from an external input (or a combination of an external input and an obtained handover word), for example.

The GPS reception processor 10 also determines a time zone by using the calculated current position and the map information stored in the storage unit 125 and calculates a local time.

The GPS reception processor 10 also obtains the date and time from a combination of the week number WN obtained from received data of SUBFRAME 1 and the time of week TOW.

Next, a local time obtaining process performed by the GPS reception processor 10 of the electronic timepiece 1 will be described.

FIG. 6 is a flowchart illustrating control procedures performed by the control unit 123 in the local time obtaining process performed by the GPS reception processor 10.

The local time acquisition process is performed when a control signal is sent from the control unit 20 to the GPS reception processor 10 in response to a user's operation of inputting a positioning operation instruction to the operation unit 28, for example. Alternatively, the local time acquisition process may be automatically started when the electronic timepiece 1 has satisfied a predetermined condition for starting the local time acquisition process, such as at predetermined time once a day or when the light intensity measured by the light intensity sensor 30 has reached a predetermined reference level or higher for the first time in a day.

When the local time obtaining process is started, the control unit 123 of the GPS reception processor 10 performs operation setting of the RF amplification unit 111 to set the operation mode of the RF amplification unit 111 to the high power mode (step S101). More specifically, the control unit 123 sends a control signal to the logic circuit 118 of the RF amplification unit 111 to turn off the switch 117a and turn on the switch 117b, so that a signal bypasses the LNA 116b and signal amplification only with the LNA 116a is performed in the RF amplification unit 111.

The control unit 123 causes the acquisition and tracking unit 122 to operate to search for satellite signals, and obtains the number of satellite signals acquired in a predetermined acquisition period (one second herein) from the start of the search (step S102).

The satellite signals transmitted from GPS satellites are each phase-modulated (spread spectrum) with a C/A code unique to the associated GPS satellite. A demodulated signal of each satellite signal can be obtained through demodulation of the satellite signal with the same C/A code as the C/A code used for modulation. In step S 102, the acquisition and tracking unit 122 obtains data on C/A codes of the GPS satellites from the storage unit 125, causes the matched filter to generate the C/A codes, and synchronizes the phases of the C/A codes with those of the C/A codes of the satellite signals to identify C/A codes capable of demodulating the satellite signals contained in the received transmitted radio waves. Herein, the operation for the C/A code identification will also be referred to as search for satellite signals or acquisition of satellite signals.

The control unit 123 determines whether or not six or more satellite signals have been acquired in one second from the start of the search for satellite signals in step S102 (step S103).

Note that the GPS reception processor 10 can calculate a current position when the GPS reception processor 10 can obtain position information from at least three or satellite signals as described above. Since, however, necessary information may not be obtained in circumstances where demodulated signals containing the acquired satellite signals are contaminated with noise or where satellite locations are not satisfactory, six or more satellite signals are acquired to allow for such circumstances, so that positioning can be completed even if some of the acquired satellite signals cannot be used.

If it is determined that six or more satellite signals have been acquired in one second from the start of the search for satellite signals ("Y" in step S103), the control unit 123 terminates the search for satellite signals performed by the acquisition and tracking unit 122, and while causing the acquisition and tracking unit 122 to track the satellite signals, decodes a satellite signal and identifies a preamble contained in WORD1 of a subframe (step S104). Since a preamble is contained in the word at the head of each subframe, a time (six seconds) corresponding to a transmission time of one subframe is set as a time for position identification for identifying preambles.

Note that the tracking of a satellite signal is an operation for controlling the phase of the C/A code generated by the acquisition and tracking unit 122 so as to continue synchronizing the generated C/A code with the C/A code of the satellite signal.

In addition, performing frequency conversion of a signal received from a positioning satellite and obtaining a signal (demodulated signal) containing a navigation message from the received signal through inverse spread spectrum using the C/A code while tracking the satellite signal will be referred to as demodulation of a satellite signal.

The control unit 123 determines whether or not preambles of six or more satellite signals have been identified in six seconds that is a time for position identification set for identification of preambles (step S105). If it is determined that preambles of six or more satellite signals have been identified in six seconds from the start of the operation for identification of preambles ("Y" in step S105), the control unit 123 performs operation setting of the RF amplification unit 111 to set the operation mode of the RF amplification unit 111 to the low power mode (step S106). More specifically, the control unit 123 sends a control signal to the logic circuit 118 of the RF amplification unit 111 to turn on both of the switches 117a and 117b, so that the RF amplification unit 111 enters a state in which a signal bypasses the LNAs 116a and 116b and signal amplification with the LNAs 116a and 116b is not performed in the RF amplification unit 111.

After the RF amplification unit 111 has entered the low power mode, the control unit 123 receives (downloads) satellite signals and decodes the received satellite signals to obtain various navigation messages while causing the acquisition and tracking unit 122 to track the satellite signals (step S114).

If it is determined that preambles of six or more satellite signals have not been identified in six seconds from the start of the operation for identification of preambles ("N" in step S105), the control unit 123 determines whether or not preambles of three to five satellite signals have been identified in six seconds (step S107). If it is determined that preambles of three to five satellite signals have been identified in six seconds from the start of the operation for identification of preambles ("Y" in step S107), the control unit 123 performs operation setting of the RF amplification unit 111 to set the operation mode of the RF amplification unit 111 to the medium power mode (step S108). More specifically, the control unit 123 sends a control signal to the logic circuit 118 of the RF amplification unit 111 to turn on the switch 117a and turn off the switch 117b, so that a signal bypasses the LNA 116a and signal amplification only with the LNA 116b is performed in the RF amplification unit 111. After the RF amplification unit 111 has entered the medium power mode, the control unit 123 advances the process to step S114.

If it is determined that preambles of three to five satellite signals have not been identified in six seconds from the start of the operation for identification of preambles ("N" in step S107), the control unit 123 advances the process to step S114 while maintaining the RF amplification unit 111 in the high power mode.

If it is determined that six or more satellite signals have not been acquired in one seconds from the start of the search for satellite signals in step S102 ("N" in step S103), the control unit 123 continues the search for satellite signals while maintaining the RF amplification unit 111 in the high power mode. The control unit 123 determines whether or not six or more satellite signals have been acquired in an acquisition time set longer than that (one second) set in step S102 (step S109). If it is determined that six or more satellite signals have been acquired ("Y" in step S109), the control unit 123 terminates the search for satellite signals performed by the acquisition and tracking unit 122, and while causing the acquisition and tracking unit 122 to track the satellite signals, decodes a satellite signal and identifies a preamble contained in WORD1 of a subframe (step S112).

The control unit 123 determines whether or not preambles of six or more satellite signals have been identified in six seconds from the start of the operation for identification of preambles (step S113). If it is determined that preambles of six or more satellite signals have been identified in six seconds ("Y" in step S113), the control unit 123 advances the process to step S108, where the control unit 123 performs operation setting of the RF amplification unit 111 to set the operation mode of the RF amplification unit 111 to the medium power mode.

If it is determined that preambles of six or more satellite signals have not been identified in six seconds from the start of the operation for identification of preambles ("N" in step S113), the control unit 123 advances the process to step S114 while maintaining the RF amplification unit 111 in the high power mode.

If it is determined in step S109 that six or more satellite signals have not be acquired ("N" in step S109), the control unit 123 determines whether or not a preset time (herein, 30 seconds) has elapsed from the start of the search for satellite signals (step S110). If the preset time has not elapsed ("N" in step S110), the control unit 123 returns the process to step S109. If the preset time has elapsed ("Y" in step S110), the control unit 123 determines whether or not three or more satellite signals have been acquired (step S111). If it is determined that three or more satellite signals have been acquired ("Y" in step S111), the control unit 123 advances the process to step S112. If it is determined that three or more satellite signals have not been acquired ("N" in step S111), the control unit 123 terminates the local time obtaining process.

The control unit 123 determines whether or not reception of satellite signals is completed in step S114 (step S115). More specifically, the control unit 123 determines whether or not predetermined information, that is, ephemeris, a week number WN, and a time of week TOW have been obtained among navigation massages (step S115). If it is determined that the predetermined information has not been obtained ("N" in step S115), the control unit 123 determines whether or not a preset time has elapsed from the start of the reception of satellite signals (step S117). If the preset time has not elapsed ("N" in step S117), the control unit 123 returns the process to step S115. If the preset time has elapsed ("Y" in step S117), the control unit 123 terminates the local time obtaining process.

If it is determined that the predetermined information has been obtained among navigation messages of the satellite signals ("Y" in step S115), the control unit 123 calculates a local time (LT) by using the obtained information and outputs the local time to the control unit 20 in the body of the electronic timepiece 1 (step S116). Specifically, since the ephemerides of at least three or more satellite signals have been obtained by step S115, the control unit 123 calculates the current position by using the ephemerides, and refers to the map information stored in the storage unit 125 to determine and obtain a time zone (TZ) (a time difference from the coordinated universal time: UTC) based on the calculated current position. The control unit 123 also obtains the UTC from the week number WN and the time of week TOW and calculates the local time by LT=UTC+TZ. When information on daylight saving time (DST) is contained in the map information stored in the storage unit 125, the control unit 123 obtains the daylight saving time associated with the current position from the map information and the calculated current position, and calculates the local time by LT=UTC+TZ+DST.

When the calculation and the output of the local time are completed, the control unit 123 terminates the local time obtaining process.

As described above, in the local time obtaining process of the present embodiment, whether the condition of reception of transmitted radio waves is in a good condition, in an intermediate condition inferior to the good condition, or in a poor condition further inferior to the intermediate condition is determined based on whether or not six or more satellite signals have been acquired in one second during the satellite signal search operation (steps S103 and S109) and whether or not preambles of a predetermined number or more satellite signals have been identified in six seconds during the preamble identification operation (steps S105, S107, and S113), and the operation setting of the RF amplification unit 111 is performed so that the operation mode of the RF amplification unit 111 is set to the low power mode, the medium power mode, or the high power mode according to the determination result. More specifically, the operation setting is performed so that the gain of the RF amplification unit 111 set in the operation setting performed when the reception condition is determined to be in the good condition (first reception condition) is smaller than that of the RF amplification unit 111 set in the operation setting performed when the reception condition is determined to be in the intermediate condition or in the poor condition (second reception condition). Furthermore, the operation setting is performed so that the gain of the RF amplification unit 111 set in the operation setting performed when the reception condition is determined to be in the intermediate condition (first reception condition) is smaller than that of the RF amplification unit 111 set in the operation setting performed when the reception condition is determined to be in the poor condition (second reception condition).

Note that the operation setting of the RF amplification unit 111 in the local time obtaining process is performed during a period in which subframes of a satellite signal that do not contain an ephemeris, a week number WN, and a time of week TOW are being transmitted, that is, a period in which SUBFRAME 4 and SUBFRAME 5 are transmitted and in which a preamble of WORD1, a TOW of WORD2, and parity bits of the respective words are not being transmitted (namely, the period hatched in FIG. 5B).

As described above, the electronic timepiece 1 according to the present embodiment includes the RF amplification unit 111 that receives transmitted radio waves from GPS satellites and amplifies signals of the received transmitted radio wave, the acquisition and tracking unit 122 to which signals amplified by the RF amplification unit 111 are input and which acquires satellite signals containing position information and date and time information from the signal, and the control unit 123 that obtains at least one of the position information and the date and time information from the satellite signals acquired by the acquisition and tracking unit 122. The control unit 123 determines the reception condition of the transmitted radio waves based on the processing condition in at least one of the acquisition and tracking unit 122 and the control unit 123, and performs operation setting of the RF amplification unit 111 according to the determined reception condition. The control unit 123 performs the operation setting so that the gain set in the operation setting performed when the reception condition is determined to be in the first reception condition is smaller than that set in the operation setting performed when the reception condition is determined to be in the second reception condition.

This enables optimization of power consumption according to the reception condition of radio waves transmitted from GPS satellites. Specifically, when the reception condition is good, the operation setting is performed so that the RF amplification unit 111 is operated in an operation mode in which the gain is low (that is, the power consumption is low and the NF is high) within a range in which satellite signals can be properly obtained. As a result, wasteful signal amplification with a high gain (low NF) despite a good reception condition can be eliminated while the gain is suitably increased in a poor reception condition, which enables control with a good balance of the gain (or the NF) and the power consumption in the RF amplification unit 111.

Furthermore, the control unit 123 determines the reception condition based on the number of satellite signals acquired in a predetermined acquisition period (one second) from the start of the operation for acquisition by the acquisition and tracking unit 122. The control unit 123 also determines the reception condition based on the number of preambles of the acquired satellite signals identified in a position identification time (six seconds). Specifically, when the control unit 123 serving as an acquisition unit or an information obtaining unit fails in a predetermined process of acquisition and reception of satellite signals, the control unit 123 serving as a gain setting unit determines the reception condition based on the condition of the failure. Furthermore, when a failure in the predetermined process occurs, the control unit 123 serving as the gain setting unit performs the operation setting of the RF amplification unit 111 so that the gain of the RF amplification unit 111 (signal amplification unit) becomes larger. Note that the predetermined process of acquisition and reception of satellite signals include acquisition of a predetermined number of satellite signals in a predetermined acquisition period from the start of the operation for acquisition by the acquisition and tracking unit 122 (acquisition unit) or identification of preambles of a predetermined number of satellite signals in a position identification time by the control unit 123 (information obtaining unit 1231). This enables determination of the reception condition of transmitted radio waves by a simple method using parameters specific to a receiver that receives transmitted radio waves from positioning satellites.

Furthermore, the control unit 123 determines the reception condition from multiple levels of reception conditions defined in advance, and performs operation setting of the gain that is discretely determined for each of the multiple levels. Specifically, the RF amplification unit 111 includes the LNAs 116a and 116b configured to amplify input signals, and the switches 117a and 117b configured to turn on/off the LNA 116a and 116b, respectively, and performs operation setting by causing the control unit 123 and the switches 117a and 117b to operate to select the LNA for amplifying the signals input to the RF amplification unit 111 from the LNAs 116a and 116b. As a result, the operation mode of the RF amplification unit 111 can be changed so that the gain, the NF, and the power consumption can be optimized with a simple configuration. Furthermore, since the NF of the RF amplification unit 111 is a value reflecting the NF of the selected LNA, the NF of the RF amplification unit 111 can be easily set.

Furthermore, the control unit 123 performs operation setting of the RF amplification unit 111 during a period in which part of a satellite signal that does not contain position information and date and time information is being received. As a result, since the operation mode of the RF amplification unit 111 is changed during a period in which the position information and the date and time information used in the local time obtaining process is being obtained, it is possible to prevent the problem of failure in obtaining the position information and the date and time information due to interruption of tracking of satellite signals.

Furthermore, the electronic timepiece 1 includes the timer circuit 25 configured to count the date and time, and the control unit 20 configured to correct the date and time of the timer circuit 25 by using date and time information when the date and time information is obtained by the control unit 123 of the GPS reception processor 10. As a result, in the electronic timepiece 1, correct date and time obtained from satellite signals transmitted from GPS satellites can be displayed.

[Second Embodiment]

Next, a second embodiment of the present invention will be described. The configuration of an electronic timepiece 1 according to the second embodiment is the same as that in the first embodiment. The second embodiment is different from the first embodiment in that the electronic timepiece 1 obtains date and time information by using transmitted radio waves from GPS satellites (date and time obtaining process) and that the date and time counted by the timer circuit 25 is corrected based on the obtained date and time information (date and time correction process). Hereinafter, differences from the first embodiment will be mainly described.

The date and time correction process performed in the second embodiment is started at a predetermined frequency such as at predetermined time once a day or when the light intensity measured by the light intensity sensor 30 has reached a predetermined reference level or higher for the first time in a day. For the predetermined time, 0:00:10 a.m. is the time at which the first date and time correction process is performed in a day, for example. When obtainment of the date and time information was unsuccessful at the time of the first date and time correction process, reception of standard radio waves may be repeated every one hour thereafter until the date and time information is successfully obtained up to 5:00:10 a.m. Furthermore, for the predetermined reference level of the detected light intensity, a light intensity measured under sunlight irradiation outdoors during the day is set, for example.

When only the date and time information is to be obtained from GPS satellites, only part of a radio wave from one satellite containing the date and time information is received, that is, orbit information necessary for positioning is not received, so that the reception time can be shortened (by about 2 to 10 seconds, for example) and power consumption can be reduced. In this case, since the distance from the current position to the satellite cannot be determined, propagation delay time can be corrected based on an average distance, for example, so that the date and time can be obtained with sufficient accuracy (about a few msec).

Hereinafter, the date and time obtaining process performed by the GPS reception processor 10 when date and time information is to be obtained from a GPS satellite will be described.

FIG. 7 is a flowchart illustrating control procedures performed by the control unit 123 in the date and time obtaining process performed by the GPS reception processor 10.

When the date and time obtaining process is started, the control unit 123 performs operation setting of the RF amplification unit 111 to set the operation mode of the RF amplification unit 111 to the low power mode (step S201).

The control unit 123 refers to operation history stored in the RAM 124 to determine whether or not the process of obtaining date and time information has been consecutively unsuccessful for the past two or more days (step S202). If it is determined that the date and time obtaining process has been consecutively unsuccessful for the past two or more days ("Y" in step S202), the control unit 123 determines whether or not the date and time obtaining process has been consecutively unsuccessful for the past four or more days (step S203). If it is determined that the date and time obtaining process was successful on one of the past four days ("N" in step S203), the control unit 123 performs operation setting of the RF amplification unit 111 to set the operation mode of the RF amplification unit 111 to the medium power mode (step S204). If it is determined that the date and time obtaining process has been consecutively unsuccessful for the past four or more days ("Y" in step S203), the control unit 123 performs operation setting of the RF amplification unit 111 to set the operation mode of the RF amplification unit 111 to the high power mode (step S205).

If it is determined in step S202 that the date and time obtaining process was successful on either of the past two days ("N" in step S202), the control unit 123 causes the acquisition and tracking unit 122 to operate to search for satellite signals and obtain the number of satellite signals acquired in a predetermined acquisition period (herein, one second) (step S206).

The control unit 123 determines whether or not one or more satellite signals have been acquired in one second from the start of the search for satellite signals in step S206 (step S207). If it is determined that no satellite signal has been acquired in one second ("N" in step S207), the control unit 123 terminates the date and time obtaining process. If it is determined that one or more satellite signals have been acquired in one second ("Y" in step S207), the control unit 123 terminates the search for satellite signals performed by the acquisition and tracking unit 122, and while causing the acquisition and tracking unit 122 to track the satellite signals, receives and decodes a satellite signal to obtain a time of week TOW contained in each subframe (step S208).

The control unit 123 determines whether or not the reception is completed, that is, whether or not the time of week TOW has been obtained in step S208 when six seconds corresponding to a transmission time of one subframe has elapsed (step S209). If it is determined that the time of week TOW has not been obtained ("N" in step S209), the control unit 123 terminates the local time obtaining process.

If it is determined that the time of week has been obtained in six seconds from the start of the reception of the satellite signals ("Y" in step S209), the control unit 123 calculates the local time (LT) based on the obtained time of week TOW and outputs the calculated local time to the control unit 20 in the body of the electronic timepiece 1 (step S210).

When the operation setting of the RF amplification unit 111 is performed so that the amplification unit 111 is operated in the medium power mode in step S204, or when the operation setting of the RF amplification unit 111 is performed so that the amplification unit 111 is operated in the high power mode in step S205, the control unit 123 causes the acquisition and tracking unit 122 to operate to search for satellite signals and obtains the number of satellite signals acquired in a predetermined acquisition period (herein, one second) (step S211).

The control unit 123 determines whether or not one or more satellite signals have been acquired in the predetermined acquisition period (one second) in step S211 (step S212). If it is determined that no satellite signal has been acquired in one second ("N" in step S212), the control unit 123 determines whether or not a preset time (herein, ten seconds) has elapsed from the start of the search for satellite signals (step S213). If the preset time has not elapsed ("N" in step S213), the control unit 123 returns the process to step S211. If the preset time has elapsed ("Y" in step S213), the control unit 123 terminates the date and time obtaining process.

If it is determined in step S212 that one or more satellite signals have been acquired ("Y" in step S212), the control unit 123 obtains a time of week TOW from a satellite signal similarly to step S208 (step S214).

The control unit 123 determines whether or not the reception is completed, that is, whether or not the time of week TOW has been obtained in step S214 when a predetermined time (herein, six seconds) has elapsed from the start of the reception of the satellite signals (step S215). If it is determined that the time of week TOW has not been obtained ("N" in step S215), the control unit 123 determines whether or not a preset time (herein, 60 seconds) has elapsed from the start of the reception of satellite signals (step S216). If the preset time has not elapsed ("N" in step S216), the control unit 123 returns the process to step S214. If the preset time has elapsed ("Y" in step S216), the control unit 123 terminates the date and time obtaining process.

If it is determined in step S215 that the date and time information has been acquired ("Y" in step S215), the control unit 123 calculates the local time (LT) based on the obtained time of week TOW and the week number WN stored in the RAM 124 or the like, and outputs the calculated local time to the control unit 20 in the body of the electronic timepiece 1 (step S210).

When the output of the date and time information is completed, the control unit 123 terminates the local time obtaining process.

After the local time obtaining process is terminated, the control unit 20 of the electronic timepiece 1 corrects the date and time counted by the timer circuit 25 based on the date and time information output by the control unit 123 of the GPS reception processor 10 (date and time correction process).

As described above, in the electronic timepiece 1 according to the present embodiment, the control unit 123 determines the reception condition based on the time (the number of days) elapsed from the latest timing at which the date and time information contained in a satellite signal was obtained. Specifically, whether the condition of reception of transmitted radio waves is in a good condition, in an intermediate condition, or in a poor condition is determined based on whether or not the date and time obtaining process (a predetermined process of acquiring and receiving satellite signals) has been unsuccessful for a predetermined number of days (steps S201 and S202), and the operation setting of the RF amplification unit 111 is performed so that the RF amplification unit 111 is operated in the low power mode, the medium power mode, or the high power mode according to the determination process. As a result, since the reception condition can be determined only by referring to past operation history, the reception condition is not determined in subsequent steps, which enables the processing to be performed at high speed. Furthermore, when the accuracy condition of the date and time calculated by the timer circuit 25 is decreased as a result of failure in the date and time obtaining process for a predetermined days as described above, operation setting for causing the RF amplification unit 111 to operate with a higher gain is performed, so as to make the date and time obtaining process likely to be successful to restore the accuracy condition of the date and time counted by the timer circuit 25.

Furthermore, the initial state of the operation mode of the RF amplification unit 111 in the date and time obtaining process is the low power mode (step S201). As a result, it is possible to suppress the problem of increase in power consumption of the RF amplification unit 111 more than necessary.

[Third Embodiment]

Next, a third embodiment of the present invention will be described. The configuration of an electronic timepiece 1 according to the third embodiment is the same as that in the first and second embodiments. In the third embodiment, determination of the reception condition based on the signal-to-noise ratios (SNRs) of demodulated signals containing acquired satellite signals is also performed in the operation of obtaining a local time in the first embodiment. In the present embodiment, the control unit 123 also functions as a signal-to-noise ratio calculation unit. Hereinafter, differences from the first embodiment will be mainly described.

Figure 8:
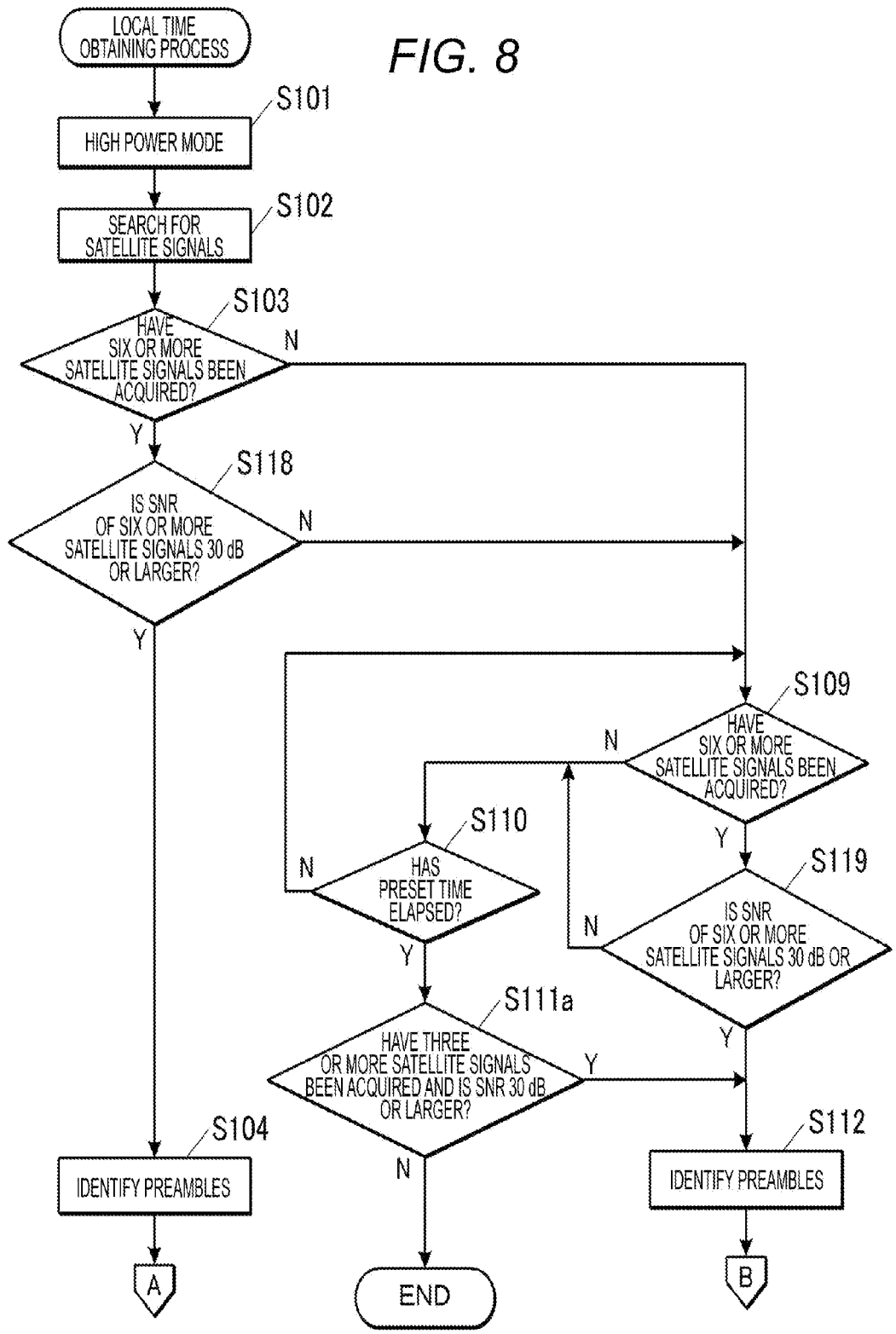
FIG. 8 is a first part of a flowchart illustrating control procedures of a local time obtaining process according to a third embodiment.

FIGS. 8 and 9 are flowcharts illustrating control procedures performed by the control unit 123 in the local time obtaining process performed by the GPS reception processor 10. The local time obtaining process according to this modification corresponds the local time obtaining process of the first embodiment illustrated in FIG. 6 except that processing of steps S118 to S122 is added and that the processing of step S111 is replaced by processing of step S111a. Since the other processing is the same, the same reference numerals will be used for the same processing and detailed description thereof will not be repeated.

If it is determined in step S103 that six or more satellite signals have been acquired in one second from the start of the search for satellite signals ("Y" in step S103), the control unit 123 determines whether or not the SNRs of the demodulated signals of six or more satellite signals are 30 dB or larger (step S118). More specifically, the control unit 123 obtains the ratios of the signal strength of the signal part to the signal strength of the noise part (SNRs) of the demodulated signals containing the satellite signals acquired by the acquisition and tracking unit 122 in step S102, and determines whether or not the ratios are a predetermined reference value (demodulation reference value) or larger, such as 30 dB or larger herein. Hereinafter, the SNRs of the demodulated signals including the satellite signals will also be referred to as the "SNRs of the satellite signals" for avoiding complication.

If it is determined that the SNRs of six or more satellite signals are 30 dB or larger ("Y" in step S118), the control unit 123 advances the process to step S104. If it is determined that the condition of the SNRs of six or more satellite signals being 30 dB or larger is not satisfied ("N" in step S118), the control unit 123 advances the process to step S109.

Similarly, if it is determined in step S109 that six or more satellite signals have been acquired ("Y" in step S109), the control unit 123 determines whether or not the SNRs of the six or more satellite signals are 30 dB or larger (step S119). If it is determined that the SNRs of the six or more satellite signals are 30 dB or larger ("Y" in step S119), the control unit 123 advances the process to step S112. If it is determined that the condition of the SNRs of the six or more satellite signals being 30 dB or larger is not satisfied ("N" in step S119), the control unit 123 advances the process to step S110.

Furthermore, if it is determined in step S110 that the preset time (30 seconds) has elapsed from the start of the search for satellite signals ("Y" in step S110), the control unit 123 determines whether or not three or more satellite signals have been acquired and whether or not the SNRs of at least three satellite signals are 30 dB or larger (step S111a). If it is determined that three or more satellite signals have been acquired and that the SNRs of at least three satellite signals are 30 dB or larger ("Y" in step S111a), the control unit 123 advances the process to step S112. If it is determined that three or more satellite signals have been acquired and that the condition of the SNRs of at least three satellite signals being 30 dB or larger is not satisfied ("N" in step S111a), the control unit 123 terminates the local time obtaining process.

As described above, in the local time obtaining process of the third embodiment, it is determined whether or not the SNRs of a predetermined number of satellite signals among the satellite signals acquired by the acquisition and tracking unit 122 are 30 dB or larger, and the process proceeds to the steps (steps S104 and S112) of identifying the preambles of the satellite signals only when it is determined that the SNRs of the predetermined number of satellite signals are 30 dB or larger.

Furthermore, if it is determined in step S105 that the preambles of six or more satellite signals have been identified in six seconds from the start of the operation for identifying preambles ("Y" in step S105), the control unit 123 determines whether or not the SNRs of three or more satellite signals are a predetermined reference value (demodulation reference value) or larger, such as 40 dB or larger herein (step S120). If it is determined that the SNRs of the three or more satellite signals are 40 dB or larger ("Y" in step S120), the control unit 123 advances the process to step S106. If it is not determined that the SNRs of the three or more satellite signals are 40 dB or larger ("N" in step S120), the control unit 123 advances the process to step S107.

Furthermore, if it is determined in step S107 that the preambles of three to five satellite signals have been identified ("Y" in step S107), the control unit 123 determines whether or not the SNRs of three or more satellite signals are 40 dB or larger (step S121). If it is determined that the SNRs of the three or more satellite signals are 40 dB or larger ("Y" in step S121), the control unit 123 advances the process to step S108. If it is not determined that the SNRs of the three or more satellite signals are 40 dB or larger ("N" in step S121), the control unit 123 advances the process to step S114.

Furthermore, if it is determined in step S113 that the preambles of six or more satellite signals have been identified ("Y" in step S113), the control unit 123 determines whether or not the SNRs of three or more satellite signals are 40 dB or larger (step S122). If it is determined that the SNRs of the three or more satellite signals are 40 dB or larger ("Y" in step S122), the control unit 123 advances the process to step S108. If it is not determined that the SNRs of the three or more satellite signals are 40 dB or larger ("N" in step S122), the control unit 123 advances the process to step S114.

As described above, in the local time obtaining process of the third embodiment, when the preambles of six or more (or three to five) satellite signals have been identified in six seconds, it is determined whether or not the SNRs of three or more satellite signals among the satellite signals are 40 dB or more, and if it is not determined that the SNRs of three or more satellite signals are 40 dB or larger, operation setting is performed so that the operation mode of the RF amplification unit 111 is shifted to a higher power (that is, lower NF) operation mode.

As described above, in the electronic timepiece 1 of the third embodiment, the control unit 123 calculates the SNRs of demodulated signals each including a satellite signal acquired by the acquisition and tracking unit 122, and determines the reception condition based on the calculation result. As a result, even when a large amount of noise is contained in a demodulated signal or when transmitted radio waves are reflected and signals are attenuated (multipath, for example) before reaching the electronic timepiece 1, the operation setting of the RF amplification unit 111 is performed according to the above, which enables control of the RF amplification unit 111 according to the reception condition taking the noise and the multipath into consideration.

Furthermore, the control unit 123 determines the reception condition based on the number of satellite signals of the demodulated signals with the calculated SNRs being a predetermined reference value or larger. This enables determination of the reception condition of transmitted radio waves by a simple method using parameters specific to a receiver that receives transmitted radio waves from positioning satellites.

Furthermore, when a predetermined number or more that is three or more preambles of acquired satellite signals have been identified in a position identification time (six seconds) set for identification of preambles, the control unit 123 determines the reception condition based on the number of satellite signals of demodulated signals with the calculated SNRs being a predetermined reference value or larger among the satellite signals whose preambles have been identified. This enables determination of the reception condition of transmitted radio waves by a simple method using parameters specific to a receiver that receives transmitted radio waves from positioning satellites.

Furthermore, in the third embodiment, it is determined whether or not the SNRs of satellite signals acquired by the acquisition and tracking unit 122 are 30 dB or larger, and it is determined whether or not the SNRs of satellite signals whose preambles are identified are 40 dB or larger. As a result of setting the reference value used for the former determination smaller than that used for the latter determination, it is possible to shorten the time for operation of searching satellites that consumes a relatively large amount of power, and reduce the power consumption of the electronic timepiece 1.

Note that the present invention is not limited to the embodiments described above, but various modifications can be made thereto.

For example, while an example in which the operation mode of only the RF amplification unit 111, which is a signal amplification unit, is changed according to the reception condition is described in the embodiments described above, the change in the operation mode is not limited thereto. For example, in conjunction with the change in the operation mode of the RF amplification unit 111, the gain of at least one of the analog filter 113 and the IF amplification unit 114, which are signal amplification units, may be changed. In this case, the gain of at least one of the analog filter 113 and the IF amplification unit 114 is changed to a predetermined value for each of the operation modes of the RF amplification unit 111 so that the dynamic range of signals input to the ADC 115 is within a range in which the ADC 115 can perform appropriate conversion. Note that the gain of the analog filter 113 is adjusted by a change in the frequency pass band. The gain of the IF amplification unit 114 may be adjusted by a change in the number of LNAs to be used among multiple LNAs similarly to the RF amplification unit 111, or may be adjusted in another manner.

Furthermore, while the NF values of the LNA 116a and 116b of the RF amplification unit 111 are 3 dB and 8 dB, respectively, in the embodiments described above, these values may be changed as appropriate according to the signal powers or the like of received satellite signals. Furthermore, while an example in which signals are made to bypass one of the two LNAs 116a and 116b so that the gain and the NF of the RF amplification unit 111 are changed is described, the manner in which the gain and the NF of the RF amplification unit 111 are changed is not limited thereto, and another method may be used.

Furthermore, while the operation mode of the RF amplification unit 111 is selected from three modes with different power consumptions in the embodiments described above, the operation modes are not intended to be limited thereto and the number of operation modes may be two or four or more.

Furthermore, an example in which the operation mode of the RF amplification unit 111 is selected from an operation mode in which only one of the two LNAs 116a and 116b is used and an operation mode in which neither of the LNAs 116a and 116b is used is presented in the embodiments described above, the operation modes are not limited thereto. For example, the operation setting of the RF amplification unit 111 may be performed in such a manner that the switches 117a and 117b are both turned off according to the reception condition, so that the RF amplification unit 111 is operated in an operation mode in which amplification is performed using both of the LNAs 116a and 116b (hereinafter referred to as a sensitivity priority mode). In the sensitivity priority mode, power consumption is higher than that in the high power mode but the NF of the RF amplification unit 111 is lower than that in the high power mode. Thus, the GPS reception processor 10 can receive transmitted radio waves from GPS satellites with higher sensitivity. The operation mode of the RF amplification unit 111 may be selected from all of the sensitivity priority mode, the high power mode, the medium power mode, and the low power mode or may be selected from two or three of these operation modes.

Furthermore, while an example in which the reception condition is determined from three levels defined in advance and operation setting of the gain that is discretely determined for each of the three levels is performed is described in the embodiments described above, the operation setting is not limited thereto. For example, a configuration in which the gain (and the NF and the power consumption) of the RF amplification unit 111 can change in continuous values may be employed, and the operation setting may be such that the control unit 123 sets the gain of the RF amplification unit 111 to nay of the continuous values according to the reception condition.

Furthermore, while an example in which the time of week TOW is obtained as the date and time information in the local time calculation process or the date and time obtaining process is described in the embodiments described above, the time of week TOW and the week number WN may be obtained as the date and time information when the week number WN has not been obtained in the past local time obtaining process or date and time obtaining process and the week number WN is not stored in the RAM 124 or the like.

Furthermore, while an example in which the position information and the date and time information are obtained in the local time calculation process is described in the first and third embodiments described above, only the position information may be obtained when only the time zone based on the position information is to be determined, for example.

While an example in which the control unit 123 determines the reception condition based on the time elapsed from the last time the date and time information contained in a satellite signal is obtained is described in the second embodiment described above, the determination is not limited thereto, and the reception condition may be determined based on the number of times the obtainment of the date and time information is unsuccessful after the latest timing at which the date and time information was obtained, for example.

Furthermore, while the reception condition is determined based on whether or not six (three in step S111) or more satellite signals have been acquired in a predetermined acquisition period from the start of the search for satellite signals (steps S103, S109, and S111) in the first and third embodiments described above, the number of satellite signals used as a criterion for the determination is not limited to six (or three) but may be any number of three or more with which a current position can be obtained on the earth within the range of the number of satellite signals that can be acquired. Furthermore, while the predetermined acquisition period for the determination is one second from the start of the search for satellite signals (steps S103 and S109), the acquisition period is not limited thereto and may be changed depending on the reception condition of transmitted radio waves from GPS satellites and the characteristics of the GPS reception processor 10.

Furthermore, while the reception condition is determined based on whether or not preambles of six or more or three or more satellite signals have been identified in six seconds from the start of the operation for identification of preambles (steps S105, S113, and S107) in the first and third embodiments described above, the number of satellite signals used as a criterion for the determination is not limited to six or three but may be any number of three or more with which a two-dimensional current position can be obtained within the range of the number of satellite signals that can be acquired. Furthermore, the period for determination is not limited to six seconds from the start of the search for satellite signals, and may be changed depending on the reception condition of transmitted radio waves from GPS satellites and the characteristics of the GPS reception processor 10.

Furthermore, while whether or not the SNRs of acquired satellite signals are 30 dB or larger is determined (steps S118, S111a, and S119) and whether or not the SNRs of satellite signals with preambles being identified are 40 dB or larger is determined (steps S120, S121, and S122) in the third embodiment described above, the reference values used as the criteria of determination are not limited to 30 dB and 40 dB, and may be changed to values depending on the setting of the gain and the NF in each of the operation modes of the RF amplification unit 111, for example.

Furthermore, while the reception condition is determined based on the number of satellite signals with the SNRs of the demodulated signals being a predetermined value or larger for both of the acquired satellite signals and the satellite signals whose preambles are identified in the third embodiment, the determination may be made on only either of the acquired satellite signals and the satellite signals whose preambles are identified.

Furthermore, while the reception condition is determined based on the number of satellite signals with the SNRs of the demodulated signals being a predetermined value of larger in the third embodiment described above, the determination is not limited thereto. In another example of control using the SNR, the control unit 123 may perform operation setting so that the gain of the RF amplification unit 111 becomes minimum within a range in which the number satellite signals of the demodulated signals with the calculated SNRs being a predetermined reference value or larger is equal to or larger than the number necessary for obtaining information by the control unit 123. As a result, the power consumption of the RF amplification unit 111 can be reduced within the range in which the control unit 123 can obtain information, which can optimize the power consumption of the electronic timepiece 1 according to the reception condition of radio waves transmitted from positioning satellites.

Furthermore, while the reception condition is determined based on the number of satellite signals with the SNRs of the demodulated signals being a predetermined value or larger, and navigation messages are then received from all of the acquired satellite signals in the third embodiment, the mode of control based on the SNRs of satellite signals is not limited thereto. For example, navigation messages may be obtained only from satellite signals with the SNRs of the demodulated signals being a predetermined value or larger among the acquired satellite signals, or a predetermined number of satellite signals may be selected in descending order of the SNRs of the demodulated signals and navigation messages may be obtained only from the selected satellite signals.

Furthermore, in the third embodiment described above, for obtaining the SNRs, the strengths of satellite signals and noise may be obtained continuously for a predetermined period (a few seconds, for example) to determine satellite signals of multipath signals and satellite signals having a large amount of noise based on signal stability, and such satellite signals may be excluded from use.

Furthermore, while various processes using satellite signals transmitted from GPS satellites that are positioning satellites are described in the embodiments described above, the type of the positioning satellites is not limited to GPS satellites, and satellite signals transmitted from other GNSS positioning satellites such as GLONASS and Galileo.

Furthermore, an example in which the GPS reception processor 10 calculates the local time from the position information and the date and time information obtained from the satellite signals is described in the embodiments described above, the control unit 20 that has obtained the position information and the date and time information from the GPS reception processor 10 may calculate the local time.

Furthermore, while an example of an analog electronic timepiece having hands is described in the embodiments described above, the electronic timepiece to which the present invention can be applied is not limited thereto, and may be an electronic timepiece that provides digital display or an electronic timepiece that provides both digital display and analog display.

Other specific details of the components, control contents and procedures, and the like presented in the embodiments described above can be modified as appropriate without departing from the scope of the present invention.

While some embodiments of the present invention have been described above, the scope of the present invention is not limited to the embodiments described above but includes the scope of the invention defined in the claims and the scope of equivalents thereof.

The invention claimed is:

1. A radio receiver comprising:
  a signal amplification unit configured to receive a radio wave transmitted from a positioning satellite and amplify a signal of the received transmitted radio wave;
  an acquisition unit to which the signal amplified by the signal amplification unit is input, the acquisition unit being configured to acquire a satellite signal containing position information and date and time information from the signal; and a control unit configured to obtain at least one of the position information and the date and time information from the satellite signal acquired by the acquisition unit, determine a reception condition of the transmitted radio wave based on at least one of a processing condition of the obtainment and a processing condition of the acquisition unit, and perform operation setting of a gain of the signal amplification unit according to the determined reception condition, wherein the control unit performs the operation setting so that the gain set in the operation setting when the reception condition is determined to be a first reception condition is smaller than the gain set in the operation setting when the reception condition is determined to be a second reception condition inferior to the first reception condition, and wherein the control unit determines the reception condition based on a number of satellite signals acquired by the acquisition unit in a predetermined acquisition period from a start of operation for the acquisition.

2. The radio receiver according to claim 1, wherein the control unit determines the reception condition based on a number of predetermined parts identified by the control unit within a position identification time set for identifying the predetermined parts, the predetermined parts being parts in transmission formats of the acquired satellite signals and being for determination of a position in the transmission formats.

3. The radio receiver according to claim 1, wherein the control unit calculates signal-to-noise ratios of demodulated signals, each containing one of the satellite signals acquired by the acquisition unit and being demodulated, and determines the reception condition based on results of calculation of the signal-to-noise ratios.

4. The radio receiver according to claim 3, wherein the control unit determines the reception condition based on the number of satellite signals of the demodulated signals with calculation results of the signal-to-noise ratios being a predetermined demodulation reference value or larger.

5. The radio receiver according to claim 2, wherein the control unit calculates signal-to-noise ratios of demodulated signals, each containing one of the satellite signals acquired by the acquisition unit and being demodulated, and determines the reception condition based on results of calculation of the signal-to-noise ratios, and wherein when three or more of the predetermined parts for determining the position in the transmission formats of the acquired satellite signals are identified within the position identification time set for identifying the predetermined parts, the control unit determines the reception condition based on a number of satellite signals of the demodulated signals with calculation results of the signal-to-noise ratios being a predetermined demodulation reference value or larger.

6. The radio receiver according to claim 3, wherein when three or more predetermined parts for determining a position in transmission formats of the acquired satellite signals are identified within a position identification time set for identifying the predetermined parts, the control unit determines the reception condition based on a number of satellite signals of the demodulated signals with calculation results of the signal-to-noise ratios being a predetermined demodulation reference value or larger.

7. The radio receiver according to claim 2, wherein the control unit calculates signal-to-noise ratios of demodulated signals, each containing one of the satellite signals acquired by the acquisition unit and being demodulated, and determines the reception condition based on results of calculation of the signal-to-noise ratios, and wherein the control unit performs the operation setting so that the gain is minimized within a range in which a number of satellite signals of the demodulated signals with calculation results of the signal-to-noise ratios being a predetermined demodulation reference value or larger is equal to or larger than a number necessary for obtaining information.

8. The radio receiver according to claim 1, wherein the control unit determines the reception condition based on time elapsed from a last timing at which the date and time information contained in the satellite signals is obtained or based on the number of times obtainment of the date and time information is unsuccessful after the last timing.

9. The radio receiver according to claim 1, wherein the control unit determines the reception condition from multiple predetermined levels, and performs the operation setting of the gain determined discretely for each of the levels.

10. The radio receiver according to claim 2, wherein the control unit determines the reception condition from multiple predetermined levels, and performs the operation setting of the gain determined discretely for each of the levels.

11. The radio receiver according to claim 3, wherein the control unit determines the reception condition from multiple predetermined levels, and performs the operation setting of the gain determined discretely for each of the levels.

12. The radio receiver according to claim 4, wherein the control unit determines the reception condition from multiple predetermined levels, and performs the operation setting of the gain determined discretely for each of the levels.

13. The radio receiver according to claim 5, wherein the control unit determines the reception condition from multiple predetermined levels, and performs the operation setting of the gain determined discretely for each of the levels.

14. The radio receiver according to claim 7, wherein the signal amplification unit includes:

multiple amplification units configured to amplify an input signal; and a switching unit configured to turn on and off each of the amplification units, and wherein the control unit performs the operation setting by causing the switching unit to operate to select an amplification unit that amplifies a signal input to the signal amplification unit from the amplification units.

15. The radio receiver according to claim 1, wherein the control unit performs the operation setting within a period in which parts of the satellite signals not containing the position information and the date and time information are received.

16. An electronic timepiece comprising:

the radio receiver according to claim 1;

a timer unit configured to count date and time; and an electronic timepiece control unit configured to correct date and time of the timer unit by using date and time information when the date and time information is obtained by the control unit of the radio receiver.

17. A radio receiver comprising:

a signal amplification unit configured to receive a radio wave transmitted from a positioning satellite and amplify a signal of the received transmitted radio wave;

an acquisition unit to which the signal amplified by the signal amplification unit is input, the acquisition unit being configured to acquire a satellite signal containing position information and date and time information from the signal; and a control unit configured to obtain at least one of the position information and the date and time information from the satellite signal acquired by the acquisition unit, determine a reception condition of the transmitted radio wave based on at least one of a processing condition of the obtainment and a processing condition of the acquisition unit, and perform operation setting of a gain of the signal amplification unit according to the determined reception condition, wherein the control unit performs the operation setting so that the gain set in the operation setting when the reception condition is determined to be a first reception condition is smaller than the gain set in the operation setting when the reception condition is determined to be a second reception condition inferior to the first reception condition, and wherein the control unit determines the reception condition based on a number of predetermined parts identified within a position identification time set for identifying the predetermined parts, the predetermined parts being parts in transmission formats of the acquired satellite signals and being for determination of a position in the transmission formats.

18. The radio receiver according to claim 17, wherein the control unit determines the reception condition from multiple predetermined levels, and performs the operation setting of the gain determined discretely for each of the levels.

* * * * *